Sept. 24, 1940.     H. S. EASTWOOD     2,215,607

MILK PAIL

Filed July 27, 1939

WITNESS:
Rob*F.Ritchel*

INVENTOR
Herbert Spencer Eastwood
BY
Busser and Harding
ATTORNEYS.

Patented Sept. 24, 1940

2,215,607

UNITED STATES PATENT OFFICE 2,215,607

MILK PAIL

Herbert Spencer Eastwood, Jersey City, N. J., assignor to The De Laval Separator Company, New York, N. Y., a corporation of New Jersey Application July 27, 1939, Serial No. 286,796

2 Claims. (Cl. 31—51)

My invention is an improvement in pails for use when milking cows, goats, etc., by hand.

The several objects of my invention are: preventing entrance to the pail or floating or falling dirt; maintaining the edge over which milk must be poured normally covered to keep it clean while allowing its ready exposure at the time of pouring; easy handling; locating all parts that have to be touched by the milker's hands so that soiling of hands will be reduced to a minimum and so that milk will not flow over them and be thereby contaminated; and providing a top or cover that may be attached while in use but is easily detachable for cleaning so that all parts of the pail and top can be easily washed and visually inspected.

These several objects are attained in the construction hereinafter described and explained.

Figure 1:
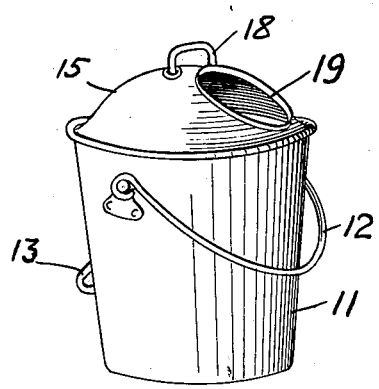
Figure 2:
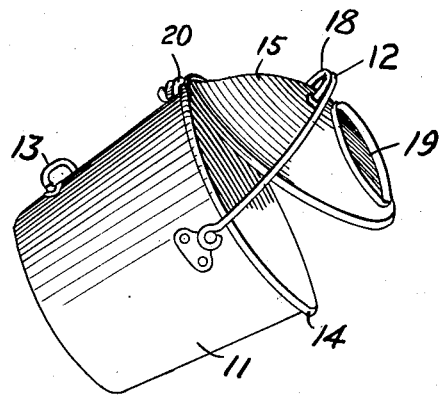
Figure 3:
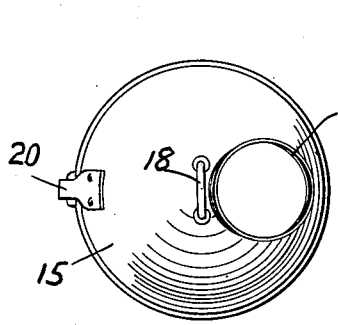
Figure 4:
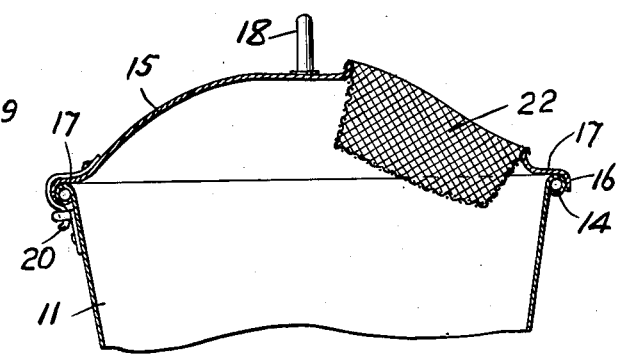
Figure 5:
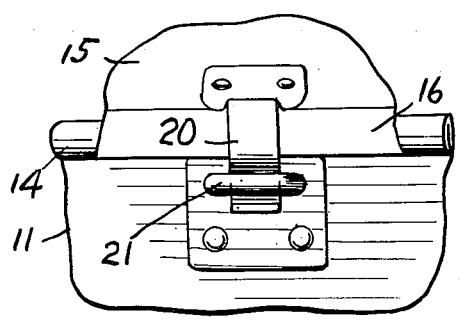
Figure 6:
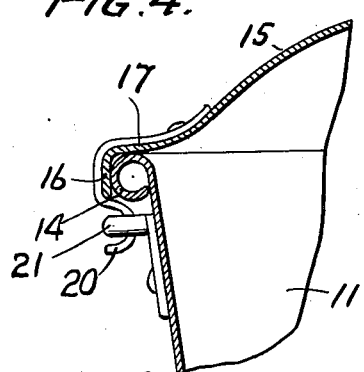

In the accompanying drawing, which illustrates a preferred embodiment of my invention: Fig. 1 is a perspective view of a complete pail assembled ready for use. Fig. 2 is a perspective view of the pail body and top in position for pouring out milk. Fig. 3 is a top view of the pail. Fig. 4 is a cross section of the top and the upper part of the pail body showing how the pail top fits over and around the top edge of the pail body to keep it clean. Fig. 5 is a back view, and Fig. 6 a side view (with the pail body and pail top in section), of the detachable hinge connection between the pail top and the pail body.

11 is the pail body having a handle or bail 12 by which it can be lifted and carried and, low down on one side, a handle 13 by which it can be tipped. Around the top of the pail there is a rolled rim 14.

A pail top or cover 15 has a depending skirt 16, adjacent to which is a nearly flat annular portion 17. At about the center of the cover is a lifting handle 18. Near one side the cover has a large hole 19 and at the opposite side a hook 20, which, in combination with an eye 21 on the pail body forms a detachable hinge connection between the pail body and cover.

When the top 15 is on the pail body 11 the flat portion 17 rests on top of the rolled rim 14 while the skirt 16 fits closely around it, excluding dirt. With hook 20 in the eye 21 and the top in the operating position, the top is securely held to the pail body; but, if the top is turned nearly bottom side up, the hook can be disengaged and the pail body and top can be separately washed and all surfaces exposed for easy inspection.

While milking the major portion of the pail is covered to exclude dirt.

22 indicates a strainer fitting in the hole in the top and adapted to catch any dirt that may fall through the hole.

While milking, the rigid top covers the major portion of the pail to exclude falling dirt and its perimeter keeps the rim of the pail body clean, while the strainer prevents entrance of dirt through the minor portion not covered by the rigid top.

When the milker desires to empty the pail, the same hand that holds the bail 12 can grasp the lifting handle 18 and raise the top 15 so as to expose a clean top edge of the pail body to pour the milk over and, at the same time, lift the strainer 22 above any level that milk will reach while being poured out. He can then, by raising the handle 13, tip the pail body and pour the milk out over a clean edge without contacting the same with the strainer.

After the pail is emptied the operator can release tipping handle 13 and lifting handle 18 and the pail body will return to a vertical position and the top drop back to the position covering its top and edge.

From the foregoing descripiton it may be understood that I have provided a milk pail top or cover which, during use, will cover a major portion of the pail body and thereby exclude falling dirt, which will keep the top edge of the pail body clean and which, while securely attached to the pail body during operation can, at other times, be readily removed therefrom so that all surfaces are exposed and accessible for cleaning and inspection.

What I claim and desire to protect by Letters Patent is:

1. A milk pail for use when milking by hand comprising a pail body, a cover the edge of which is detachably hinged to the edge of the pail body and having, between its center and the edge opposite its hinged connection, a milk receiving opening, a carrying bail hinged to opposite sides of the pail body below its upper edge and at equal distances from said hinged connection, and a cover-lifting handle so located on the cover that, preparatory to emptying the pail, the bail can be lifted and the cover raised, by the same hand, to bring said bail and handle into alignment during the pouring out of the milk.

2. A milk pail for use when milking by hand comprising a pail body, a dome-shaped cover the edge of which is detachably hinged to the edge of the pail body and having, between its center and the edge opposite its hinged connection, an opening to receive milk, a strainer covering said opening and the edge of which is secured around the edge of said opening, a carrying bail hinged to opposite sides of the pail body below its upper edge at equal distances from said hinged connection, a body-tipping handle on the pail body directly below said hinged connection and nearer the bottom than the top of the body, and a cover-lifting handle so located on the top of the cover that, preparatory to emptying the pail, the bail can be lifted and the cover raised with one hand to bring said handle and bail into alignment and raise said strainer above the adjacent edge of the pail body and the body tilted to discharge the milk without contact with the strainer.

HERBERT SPENCER EASTWOOD.